March 24, 1959 D. R. MUSS ET AL 2,879,481

MODULATOR

Filed March 15, 1955 2 Sheets-Sheet 1

WITNESSES

E. A. McCloskey

T. H. Murray

INVENTORS
Daniel R. Muss
and Richard L. Longini.
BY
F. E. Browder
ATTORNEY

United States Patent Office 2,879,481

Patented Mar. 24, 1959

2,879,481

MODULATOR

Daniel R. Muss and Richard L. Longini, Pittsburgh, Pa., assignors to Westinghouse Electric Corporation, East Pittsburgh, Pa., a corporation of Pennsylvania Application March 15, 1955, Serial No. 494,349

1 Claim. (Cl. 332—52)

This invention relates to modulator circuits and more particularly to a modulator circuit in which the variable susceptance of a crystal rectifier is used to effect amplitude modulation.

Asymmetric conductors of electricity may be divided into two general classes, i.e., those in which contact is made between bodies of different electrical conductivity (1) over a relatively wide area or (2) at a point or at several points. Such devices are called crystal rectifiers or crystal detectors. In either case, there is a boundary condition between the bodies which inhibits current flowing in one direction more than in the other. This invention deals primarily with the type in which contact between the two bodies is made over a relatively large area. More specifically, it deals with p-n fused junction diodes which, in general, consist of a single crystal of n-type germanium, part of which is electrically formed or converted into p-type germanium or vice versa.

As will become apparent from the following description, the fused junction diode behaves as a capacitor having a fixed susceptance value for frequencies above a certain predetermined frequency, assuming that a fixed bias voltage is applied across the diode. If the direct-current bias across the diode is varied, its susceptance and, consequently, its current resistive property are varied also. This phenomenon is used in the present invention in providing an electrical network which can be used for amplitude modulation and for other purposes.

Accordingly, it is an object of our invention to provide a modulator circuit in which the susceptance of a fused junction diode is varied as a function of a bias voltage to produce variable attenuation of a carrier signal and, consequently, amplitude modulation of that carrier signal.

Another more general object of our invention is to provide means for varying the susceptance of a crystal rectifier at frequencies above a certain predetermined frequency.

Still another object of our invention lies in the provision of a modulator circuit which produces power amplification for modulating signals.

Essentially, our invention consists of a fused p-n junction diode and an impedance element connected in series across a source of alternating-current voltage together with some means for varying a bias voltage applied to the diode. When the frequency of the alternating-current source is above a predetermined frequency, and when the direct-current bias voltage across the diode is varied in accordance with variations in a modulating signal, the output signal appearing across the aforesaid impedance element will be a modulated signal having the frequency of the alternating-current source.

Other objects and features of our invention will become apparent from the following detailed description taken in connection with the accompanying drawings which form a part of this specification and in which.

Figure 1:
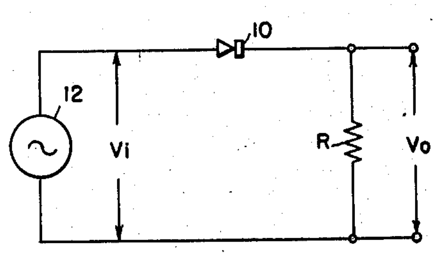
Figure 1 is a circuit diagram of a p-n fused junction diode and a resistor in series across a source of A.C. voltage.
Figure 2:
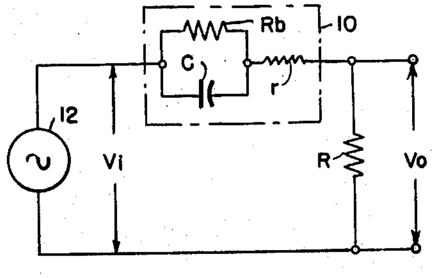
Figure 2 is an equivalent circuit of the network shown in Figure 1.

Referring to Figure 1, the circuit shown includes a fused p-n junction semiconductor diode 10 connected in series with a resistor R across a source of alternating-current voltage 12. In the present embodiment, diode 10 consists, essentially, of a body of p-type germanium which is fused with, or pressed against, a body of n-type germanium. In accordance with the well-known theory of semiconductive materials, the boundary condition between the n-type and p-type bodies inhibits current passing in one direction more than in the other, thereby facilitating rectification. The equivalent circuit for the diode is shown in Figure 2 and comprises a nonlinear resistance $R_b$ shunted by a nonlinear capacitance C, the two being in series with a linear resistance $r$. The factor $R_b$ is the nonlinear resistance of the barrier between the n-type and p-type germanium bodies. The resistance $r$ is the spreading resistance resulting from the constriction of current flow lines in the semiconductors near the barrier separating them. The barrier capacitance C arises from the storage of charge in the boundary layer. Since the magnitude of the capacitance C depends upon the thickness of the barrier layer, which in turn is a function of the applied voltage, the capacitance is nonlinear.

Although the above discussion has been confined to a p–n junction diode, it should be understood that the equivalent circuit shown in Figure 2 applies to all rectifiers generally known as "crystal rectifiers." The other main type of crystal rectifier, other than the fused p-n junction type described above, is the point contact type which consists of a metallic conductor or "cat whisker" having a pointed end pressed against the surface of a body of semiconductive material. In the case of the p–n junction diode used in the present embodiment, at low frequencies and at about one volt direct-current bias in the reverse direction, $R_b$ is approximately equal to $10^5$ ohms, C is approximately equal to 100 micro-microfarads, and $R_b$ is very much greater than $r$. The resistance $r$ is, therefore, usually neglected in determining the characteristics of the diode.

The susceptance of diode 10 equals the reciprocal of its capacitive reactance. That is, $B(\text{susceptance}) = 2\pi fC$ where $f$ is the frequency of an applied signal and C is the capacity of the capacitance C shown in the equivalent circuit of Figure 2. If the susceptance B is plotted experimentally as a function of $2\pi f$, a graph such as that shown in Figure 3 results. Note that the susceptance increases linearly with $2\pi f$ until a certain value of the factor $2\pi f$ is reached. In the graph this value is indicated by $2\pi f_1$. From $2\pi f_1$ to $2\pi f_0$ the plot is no longer linear;

and for increasing values of $f$ above $f_0$, the susceptance B remains constant.

If a junction diode such as that described above is used in the circuit of Figure 1, represented by the quivalent circuit of Figure 2, it can be shown that:

$$\frac{V_o}{V_i}=\frac{R2\pi fC}{\sqrt{(R2\pi fC)^2+1}}\ \text{exp.}\ [\sqrt{-1}\ \tan^{-1} R2\pi fC]$$

where $\tan^{-1} R2\pi fC$ is the phase shift and the coefficient is the attenuation of the circuit. If $f$ is greater than $f_0$ (Figure 3), $2\pi fC=B=a$ constant. Therefore, $$\frac{V_o}{V_i}=\frac{RB}{\sqrt{(RB)^2+1}}\ \text{exp.}\ [\sqrt{-1}\ \tan^{-1} RB]$$

and the circuit provides constant phase shift and attenuation for frequencies higher than $f_0$.

At frequencies at which the susceptance of the diode is constant (i.e., above $f_0$), the back resistance $R_b$ is effectively shunted by the barrier capacitance C; and the diode acts as a capacitor. For example, when $f_0$ is approximately equal to $10^6$ cycles per second and a one volt direct-current bias is applied to the diode in the reverse direction, then (in approximation)

$C=100$ micro-microfarads
$2\pi fC=10^{-3}$ mhos, and
$R_b=10^5$ ohms

Therefore, the capacitive reactance of the diode $$\frac{1}{2\pi fC}$$

is much smaller than the back resistance $R_b$ and most of the current through the diode flows through the capacitive branch of the equivalent circuit shown in Figure 2.

Figure 4:
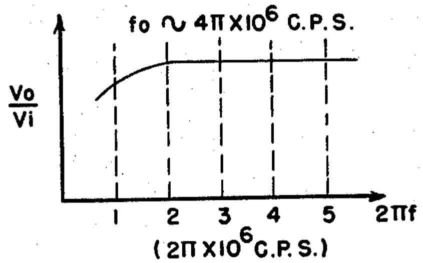

An experimental plot of the factor $$\frac{V_o}{V_i}$$

versus $2\pi f$ is shown in Figure 4. Note that the attenuation afforded by the diode is constant with respect to frequency for frequencies above $f_0$.

Figure 3:
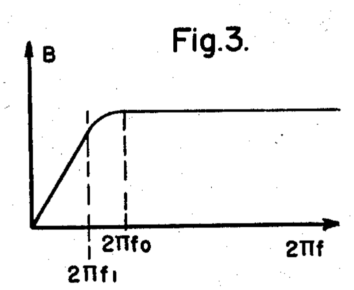
Figures 3 and 4 are graphs illustrating certain of the characteristics of the diode shown in Figure 1.
Figure 5:
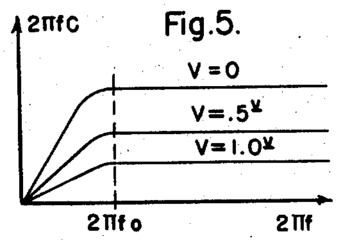
Figure 5 is a graph showing the variation in susceptance of a fused p-n junction diode as a function of the bias voltage applied to the diode.

Up to this point, the description of the properties of diode 10 has been confined to the case where the direct-current bias on the diode is constant. In Figure 3, the graph of $2\pi fC$ versus $2\pi f$ was plotted for a bias voltage of zero. If different bias voltages are applied across the diode other curves of $2\pi fC$ versus $2\pi f$ will result. This phenomenon is illustrate din Figure 5 which shows a typical set of curves of $2\pi fC$ versus $2\pi f$ with direct-current bias voltage as a parameter.

Figure 6:
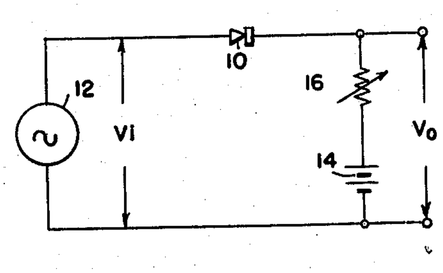
Figure 6 is a circuit diagram showing means for varying the direct-current bias across a junction diode.
Figure 7:
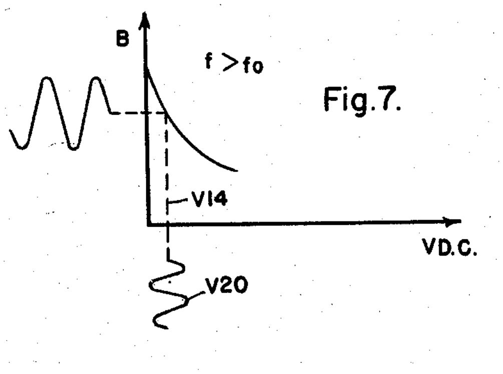
Figure 7 is a plot of the susceptance of a fused junction diode versus applied bias voltage for frequencies above a predetermined frequency.

The circuit shown in Figure 6 is substantially the same as that shown in Figure 1 except that a source of direct-current bias voltage 14 and a variable resistance 16 are now connected in series with diode 10 across alternating-current voltage source 12. If the frequency of source 12 is above $f_0$ so that the susceptance B of diode 10 is constant, and if the direct-current bias across the diode is varied, the curve of susceptance (B) versus direct-current bias voltage ($V_{DC}$) shown in Figure 7 will result. It can be seen that the susceptance decreases as the direct-current bias increases.

Figure 8:
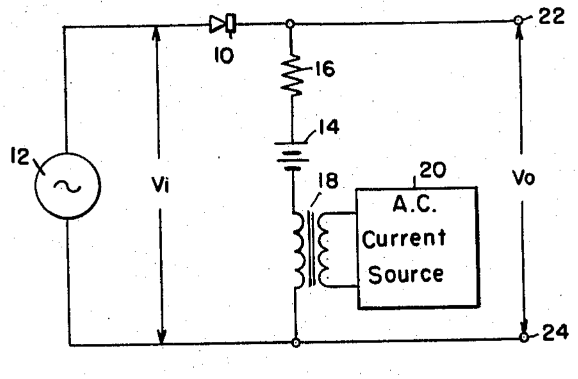
Figure 8 is a circuit diagram showing a means for varying the direct-current bias voltage on a junction diode in accordance with variations in a modulating signal.
Figure 9:
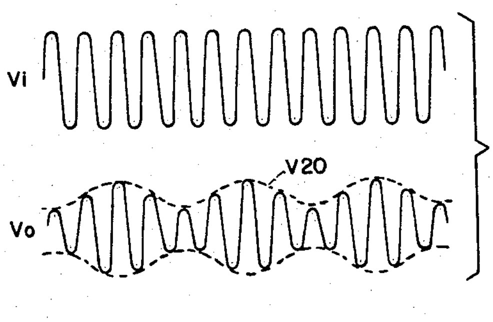
Figure 9 is a graphical illustration of the input and output waveforms for the circuit of Figure 8.

Going one step further, if the circuit shown in Figure 6 is modified as shown in Figure 8 so that the secondary winding of a transformer 18 is connected in series with voltage source 14 and resistor 16, and if a source of alternating current 20 is applied to the primary winding of transformer 18, the susceptance of diode 10 will vary as a function of the instantaneous amplitude of the alternating current from source 20. This is graphically illustrated in Figure 7. The direct-current voltage $V_{14}$ from source 14 is varied by the alternating-current voltage $V_{20}$ from source 20 to produce a corresponding variation in the susceptance B. As the susceptance varies, the capacitive reactance of diode 10 will vary also; and, therefore, the output signal $V_0$ appearing across terminals 22 and 24 will be an amplitude-modulated signal which has a frequency equal to the frequency of source 12 and which has an outer envelope having a frequency equal to the frequency of the modulating voltage from source 20 and an amplitude proportional to the amplitude of the aforesaid modulating voltage. The output signal $V_i$ from source 12 and the modulated output signal appearing across terminals 22 and 24 are shown in Figure 9.

In designing and constructing a circuit such as the one shown in Figure 8, it is important to remember that the frequency of the signal or alternating current from source 20 should be below $f_1$ (i.e., below 100,000 c.p.s.) if the circuit is to function properly as a modulater. In Figure 3 it can be seen that in the range from zero to $f_1$, the susceptance of the diode varies linearly with $2\pi f$. In the range between $f_1$ and $f_0$, the susceptance varies as a function of frequency, but the variation is not linear. Consequently, the frequency of the modulating signal should be below $f_1$ and, in all cases, must be below $f_0$. Since $f_1$ is approximately 100,000 c.p.s., and since the range of audio signals is well below this value, the circuit is readily adaptable for use as an audio modulator. On the other hand, the frequency of the signal from source 12 must be a high frequency signal (i.e., above $f_0$) in order that it operate in the range where the susceptance of the diode is constant.

Typical operating conditions for the circuit of Figure 8 are as follows:

$V_{14}=1.0$ volt
$V_i=1.0$ volt
$V_o=0.2$ volt
$B=0.6\times10^{-3}$ mhos
$f_{12}=2$ megacycles per second
$f_{20}=$frequency of modulating signal from source $20=$ 1000 cycles per second.
$R_{16}=1000$ ohms.
Percentage modulation=20.

Figure 10:
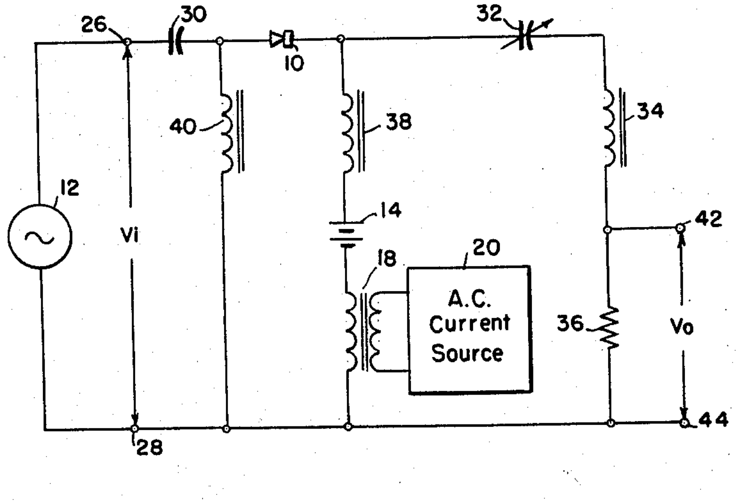
Figure 10 is a circuit substantially the same as the circuit of Figure 8, with certain refinements to obtain a higher percentage modulation.

A much more detailed circuit for obtaining amplitude modulation with the use of a junction diode is shown in Figure 10. In this circuit, greater sensitivity and a larger modulation percentage are obtained. It comprises a source of alternating-current voltage 12 having a pair of terminals 26 and 28. Between these terminals is an alternating-current path of a capacitor 30, diode 10, a capacitor 32, an inductance 34, and a load impedance 36. A direct-current path for the bias voltage applied to diode 10 is provided through inductance 38, direct-current voltage source 14, the secondary winding of transformer 18, and inductance 40.

Inductances 38 and 40 are chokes which provide a path for the modulating signal from source 20 and the direct current from source 14 while presenting a high impedance to signals having the frequency of source 12. Capacitor 30 keeps the modulating signal and the direct-current bias out of the signal generator 12, while the variable capacitor 32 keeps these components out of the output branch of the circuit. Condenser 32 also provides tuning for the series resonant circuit of elements 32 and 34. The resonant circuit is tuned to a point just off resonance so that changes in diode susceptance cause nearly linear changes in the output voltage. If the modulating signal from source 20 should be an audio signal and the output from source 20 an RF carrier signal, the output signal across impedance 36 will be an RF signal attenuated and amplitude modulated by the audio signal. In actual practice, percentage modulations up to 40% have been observed with this circuit.

The use of the variable susceptance of a diode at frequencies higher than $f_0$ can be applied to other types of electrical networks to obtain amplitude modulation. In addition, it will be readily apparent to those skilled in the art that this principle can be used to provide frequency or phase modulation. The diode can, for example, be used in the tank circuit of an RF oscillator.

By varying the susceptance of the diode in accordance with variations in a direct-current bias voltage, the output frequency of the oscillator can be controlled.

It is important to note that at high frequencies an electrical network such as that shown in Figure 10 provides power amplification for the audio or other modulating signals from source 20. The input impedance that the signal from source 20 sees is high, namely, the back impedance of diode 10 biased by some small direct-current voltage. This input impedance is the resistance $R_b$ shown in Figure 2 which is approximately equal to $10^5$ ohms. The output impedance is small, namely, the impedance 36 which has to be only of the order of the magnitude of the equivalent impedance of the tank circuit of elements 33 and 34. The impedance of element 36 will be somewhere in the range between 10 and 1000 ohms. Thus, even though the voltage level of the output modulating signal is smaller than that from source 20, power amplification will result.

The power amplification effect of the network described above can be tested by connecting some sort of detecting means to the output terminals 42 and 44 of the circuit of Figure 10. Such a detector might be a point contact crystal rectifier in series with the parallel combination of a resistance and a capacitor. An actual test of the network of Figure 10 shows a power amplification of slightly higher than one. Typical values are given below.

Input audio voltage (R.M.S.) $= V_i = 0.15$ volt
Input impedance $= R_i = 200{,}000$ ohms
Output audio voltage (R.M.S.) $= V_o = 0.005$ volt
Output impedance $= R_o = 200$ ohms $$\text{Input power} = \frac{V_i^2}{R_i} = 1.1 \times 10^{-7} \text{ watts}$$

$$\text{Output power} = \frac{V_0^2}{R_0} = 1.2 \times 10^{-7} \text{ watts}$$

$$\text{Power gain} = \frac{1.2 \times 10^{-7}}{1.1 \times 10^{-7}} \sim 1.1$$

It should be noted that this type of circuit could be used to couple semiconducting transistor amplifier stages, the emitter of the transistor providing the necessary detection. The transistor has a very low impedance input and a fairly high impedance output. In such an application, the carrier signal is used and then discarded in the transistor. Operating as a coupling device, this circuit would provide both impedance matching and power amplification; whereas the methods of coupling generally used cause considerable attenuation.

It can thus be seen that the present invention provides a modulator in which the susceptance of a semiconducting diode is varied in accordance with a bias voltage at frequencies above a predetermined frequency to obtain amplitude modulation. Although we have described our invention in connection with certain specific embodiments, it should be readily apparent to those skilled in the art that various changes in form and arrangement of parts can be made to suit requirements without departing from the spirit and scope of the invention. In this respect, any rectifier can be used in place of the p–n fused junction diode described herein as long as the rectifier has similar properties so that its susceptance or current resisting property may be changed as a function of a control voltage or current.

We claim as our invention:

A modulator circuit comprising a source of alternating-current voltage, a pair of output terminals for said voltage source, a capacitor and a first inductor connected in series across said terminals, the series combination of a crystal rectifier, a second inductor, a source of direct-current voltage and a third inductor connected in shunt with said first inductor, said first and second inductors being such as to present a high impedance at the frequency of said source of alternating-current voltage, the combination of a second capacitor, a fourth inductor and a load impedance connected in series with said first capacitor and said rectifier across said output terminals, said second capacitor and fourth inductor forming a series resonant circuit having a resonant frequency substantially equal to the frequency of said source of alternating-current voltage, a source of modulating voltage for said source of alternating-current voltage, and means for inductively coupling said modulating voltage to said third inductor.

References Cited in the file of this patent

UNITED STATES PATENTS

| | | |
|---|---|---|
| 1,598,453 | Scott-Taggart | Aug. 31, 1926 |
| 1,712,993 | Heising | May 14, 1929 |
| 2,086,602 | Caruthers | July 13, 1937 |
| 2,191,315 | Guanella | Feb. 20, 1940 |
| 2,576,026 | Meacham | Nov. 20, 1951 |